(12) United States Patent  
Crompton et al.

(10) Patent No.: US 8,480,134 B2  
(45) Date of Patent: Jul. 9, 2013

(54) PIPING JOINT ASSEMBLY SYSTEM AND METHOD WITH SEALING RING STABILIZER

(75) Inventors: David B. Crompton, Tiverton, RI (US); Libardo Ochoa Dias, Pawtucket, RI (US)

(73) Assignee: Quick Fitting, Inc., Warwick, RI (US)

( * ) Notice: Subject to any disclaimer, the term of this patent is extended or adjusted under 35 U.S.C. 154(b) by 0 days.

(21) Appl. No.: 13/490,653

(22) Filed: Jun. 7, 2012

(65) Prior Publication Data

US 2012/0284994 A1   Nov. 15, 2012

Related U.S. Application Data

(63) Continuation-in-part of application No. 13/246,562, filed on Sep. 27, 2011, now Pat. No. 8,205,915, which is a continuation-in-part of application No. 12/981,855, filed on Dec. 30, 2010, now Pat. No. 8,210,576, which is a continuation of application No. 11/807,072, filed on May 25, 2007, now Pat. No. 7,862,089.

(60) Provisional application No. 61/473,418, filed on Apr. 8, 2011.

(51) Int. Cl.
*F16L 21/02* (2006.01)

(52) U.S. Cl.
USPC .............................. 285/340; 29/521; 285/315

(58) Field of Classification Search
USPC ..... 285/340, 315, 307, 308, 342, 343; 29/521
See application file for complete search history.

(56) References Cited

U.S. PATENT DOCUMENTS

| | | |
|---|---|---|
| 1,822,056 A | 9/1931 | Noble |
| 2,456,203 A | 12/1948 | Loepsinger |
| 3,140,107 A | 7/1964 | Hynes |
| 3,365,219 A | 1/1968 | Nicolaus |
| 3,679,241 A | 7/1972 | Hoffmann |
| 4,123,090 A | 10/1978 | Kotsakis et al. |
| 4,178,023 A | 12/1979 | Guest |
| 4,220,361 A | 9/1980 | Brandenberg |
| 4,288,113 A | 9/1981 | Saulnier |

(Continued)

FOREIGN PATENT DOCUMENTS

| | | |
|---|---|---|
| DE | 4304241 | 8/1994 |
| EP | 272988 | 6/1986 |

(Continued)

OTHER PUBLICATIONS

Cash ACME, Sharkbite(R) Push Fittings: A Connection System for Copper, CPVC or PEX pipe, Dec. 6, 2006, U.S.

*Primary Examiner* — David E Bochna
(74) *Attorney, Agent, or Firm* — Williams Mullen, PC; Thomas F. Bergert

(57) ABSTRACT

A pipe fitting and associated piping joint assembly package allow re-use and repair of push-fit, formed piping elements without damage to the fitting or valve elements or the pipe, and without coining, gluing or threaded engagement of parts. In one embodiment, the present invention includes a pipe fitting having first and second radial housing elements for receiving one or more sealing members and a fastening ring, respectively. In one embodiment, the present invention further includes a sealing member stabilizer element, a housing divider element and a snap ring support member cooperatively engageable so as to facilitate the secure retention and optional removal of an inserted piping element.

21 Claims, 15 Drawing Sheets

U.S. PATENT DOCUMENTS

| | | |
|---|---|---|
| 4,305,606 A | 12/1981 | Legris |
| 4,440,424 A | 4/1984 | Mode |
| 4,508,369 A | 4/1985 | Mode |
| 4,613,172 A | 9/1986 | Schattmaier |
| 4,630,848 A | 12/1986 | Twist et al. |
| 4,637,640 A | 1/1987 | Fournier et al. |
| 4,645,246 A | 2/1987 | Guest |
| 4,685,706 A | 8/1987 | Kowal et al. |
| 4,802,696 A | 2/1989 | Chohan et al. |
| 4,895,395 A | 1/1990 | Ceriani |
| 4,919,457 A | 4/1990 | Moretti |
| 5,024,468 A | 6/1991 | Burge |
| 5,084,954 A | 2/1992 | Klinger |
| 5,160,179 A | 11/1992 | Takagi |
| 5,230,539 A | 7/1993 | Olson |
| 5,284,582 A | 2/1994 | Yang |
| 5,292,157 A | 3/1994 | Rubichon |
| 5,370,423 A | 12/1994 | Guest |
| 5,487,572 A | 1/1996 | Combot-Courrau et al. |
| 5,577,530 A | 11/1996 | Condon |
| 5,603,532 A | 2/1997 | Guest |
| 5,711,550 A | 1/1998 | Brandt |
| 5,722,696 A | 3/1998 | Teneya |
| 5,769,462 A | 6/1998 | Angell |
| 5,887,911 A | 3/1999 | Kargula |
| 5,911,443 A | 6/1999 | Le Quere |
| 5,957,509 A | 9/1999 | Komolrochanaporn |
| 5,983,917 A | 11/1999 | Thomas |
| 6,145,887 A | 11/2000 | Cambot-Courrau |
| 6,174,002 B1 | 1/2001 | Rho |
| 6,357,802 B1 | 3/2002 | Nozato et al. |
| 6,447,019 B1 | 9/2002 | Hosono et al. |
| 6,517,124 B1 | 2/2003 | Le Quere |
| 6,578,879 B2 | 6/2003 | Muto |
| 6,612,623 B2 | 9/2003 | Salomon-Bahis |
| 6,685,230 B1 | 2/2004 | Bottura |
| 6,764,102 B2 | 7/2004 | Ezura |
| 6,824,172 B1 | 11/2004 | Komolrochanaporn |
| 6,869,109 B2 | 3/2005 | Matsushita |
| 6,979,026 B2 | 12/2005 | Kasahara et al. |
| 7,195,287 B2 | 3/2007 | Wai |
| 7,273,235 B2 | 9/2007 | Coquard et al. |
| 7,316,429 B2 | 1/2008 | Viegener |
| 7,380,836 B2 | 6/2008 | Bogdanowicz et al. |
| 7,448,654 B2 | 11/2008 | Le Quere |
| 7,475,913 B2 | 1/2009 | Muto |
| 7,509,971 B2 | 3/2009 | Kajuch |
| 7,530,606 B1 | 5/2009 | Yang |
| 7,621,569 B2 | 11/2009 | Anthoine |
| 7,644,955 B1 | 1/2010 | Komolrochanaporn |
| 7,850,208 B2 | 12/2010 | Greenberger |
| 7,862,089 B2 | 1/2011 | Crompton |
| 7,914,050 B2 | 3/2011 | Udhofer et al. |
| 2003/0057701 A1 | 3/2003 | Koo |
| 2004/0070198 A1 | 4/2004 | Rohrig |
| 2004/0245766 A1 | 12/2004 | Vallee |
| 2007/0075542 A1 | 4/2007 | Glaze et al. |
| 2010/0253064 A1 | 10/2010 | Le Quere |
| 2011/0101685 A1 | 5/2011 | Lai |

FOREIGN PATENT DOCUMENTS

| | | |
|---|---|---|
| EP | 1521027 | 4/2005 |
| EP | 2256394 | 1/2010 |
| GB | 2146400 | 4/1985 |
| GB | 2328259 | 2/1999 |
| JP | 2001032984 | 2/2001 |
| WO | 99/39124 | 8/1999 |
| WO | 0079173 | 12/2000 |

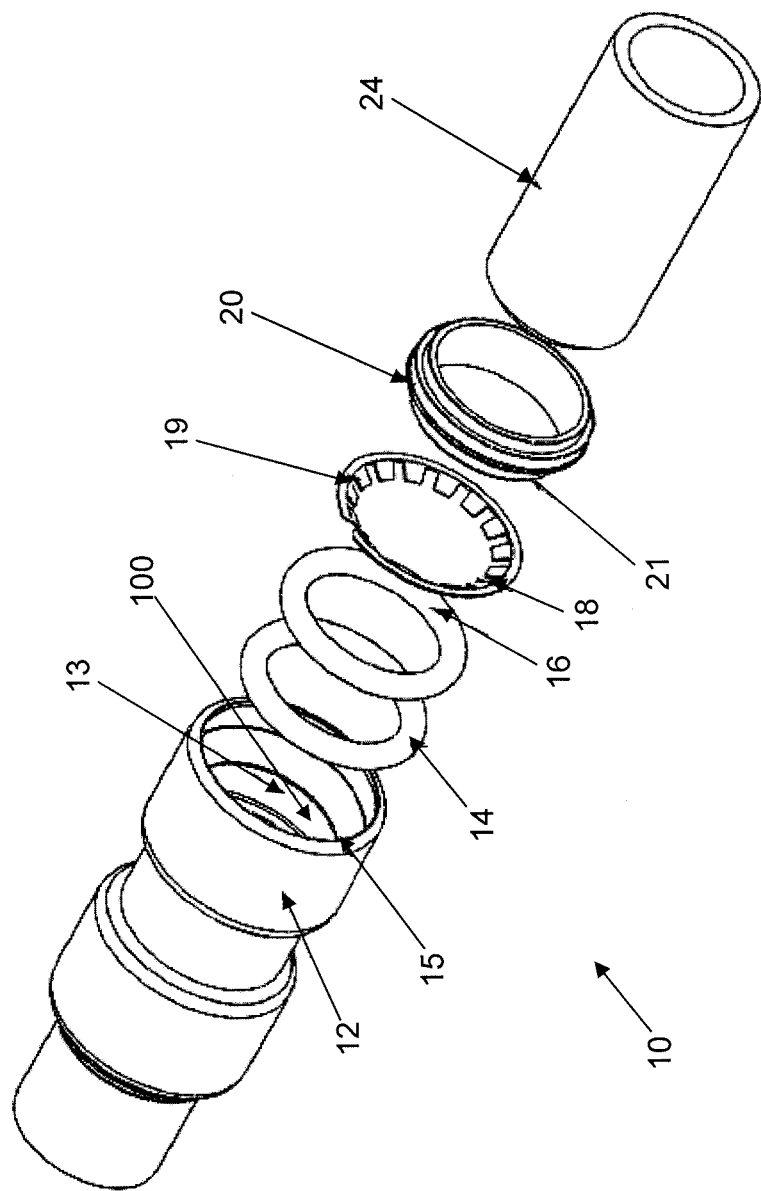

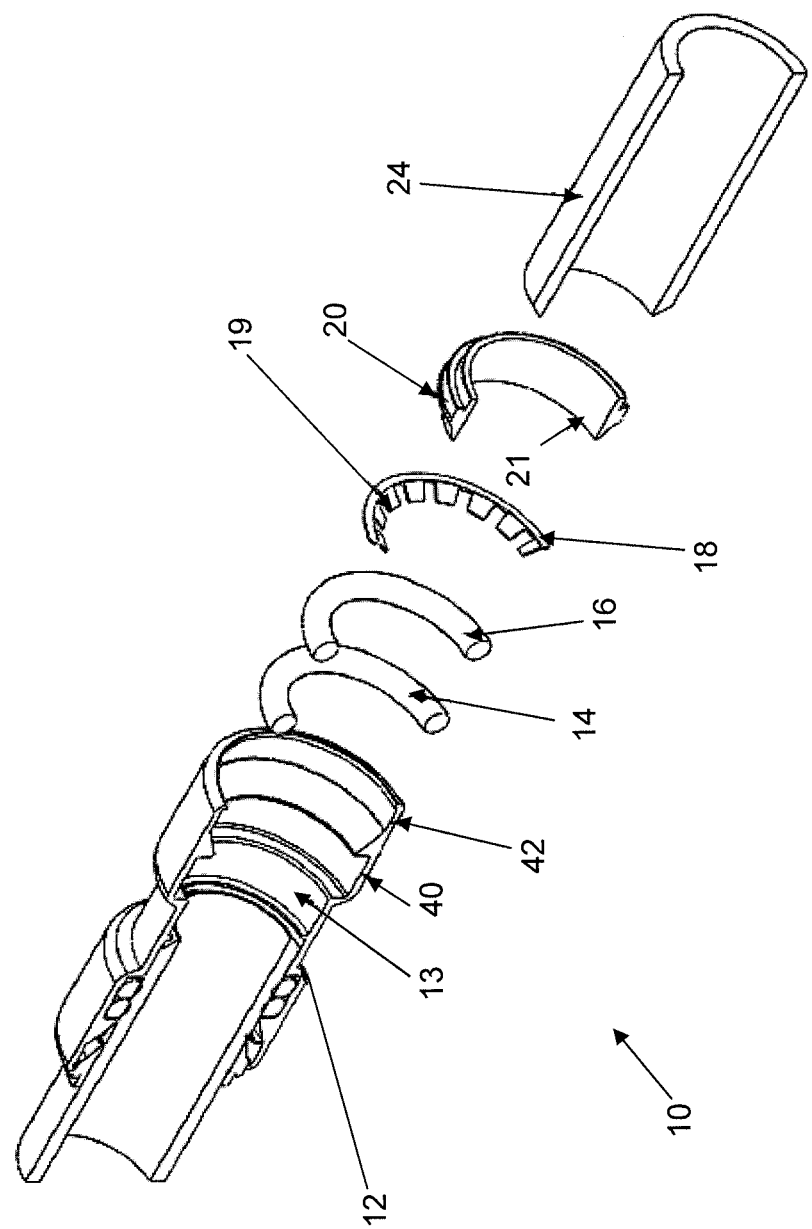

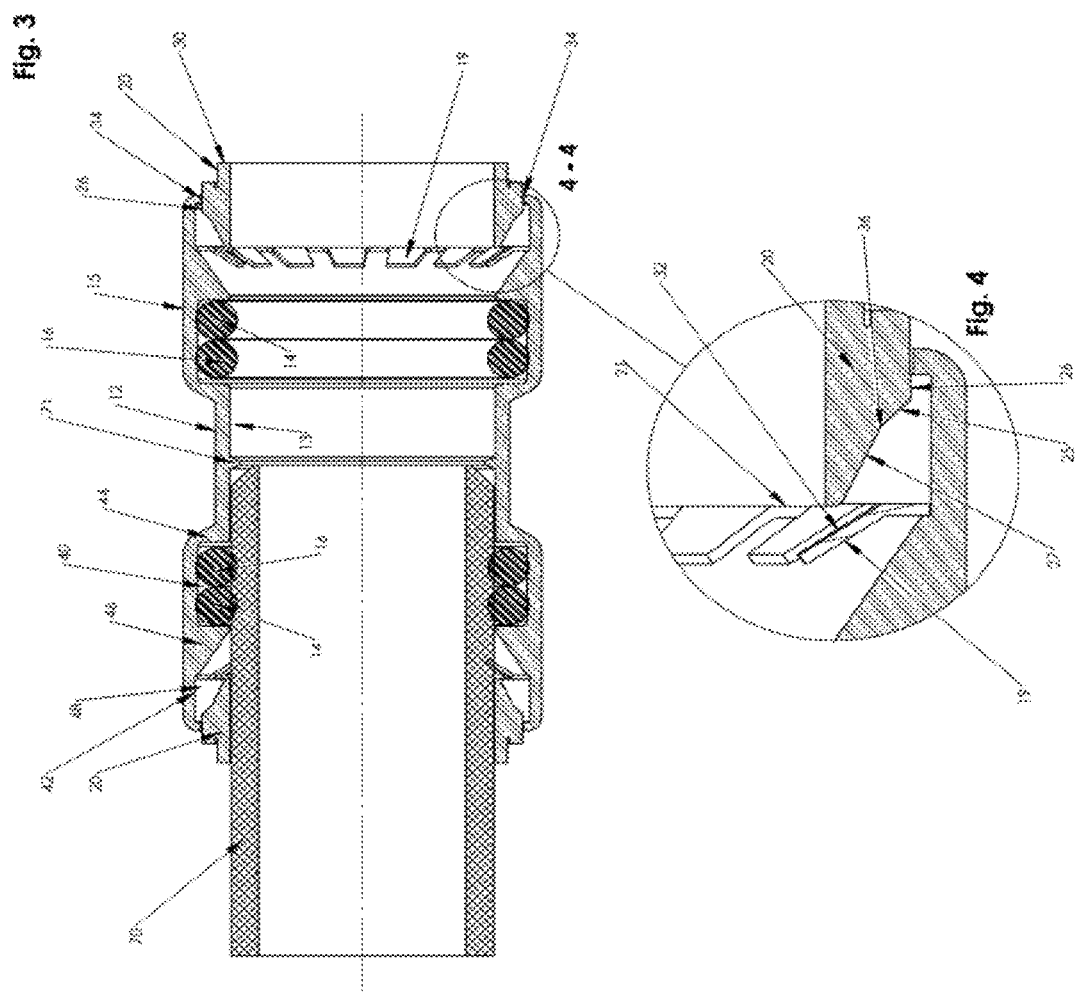

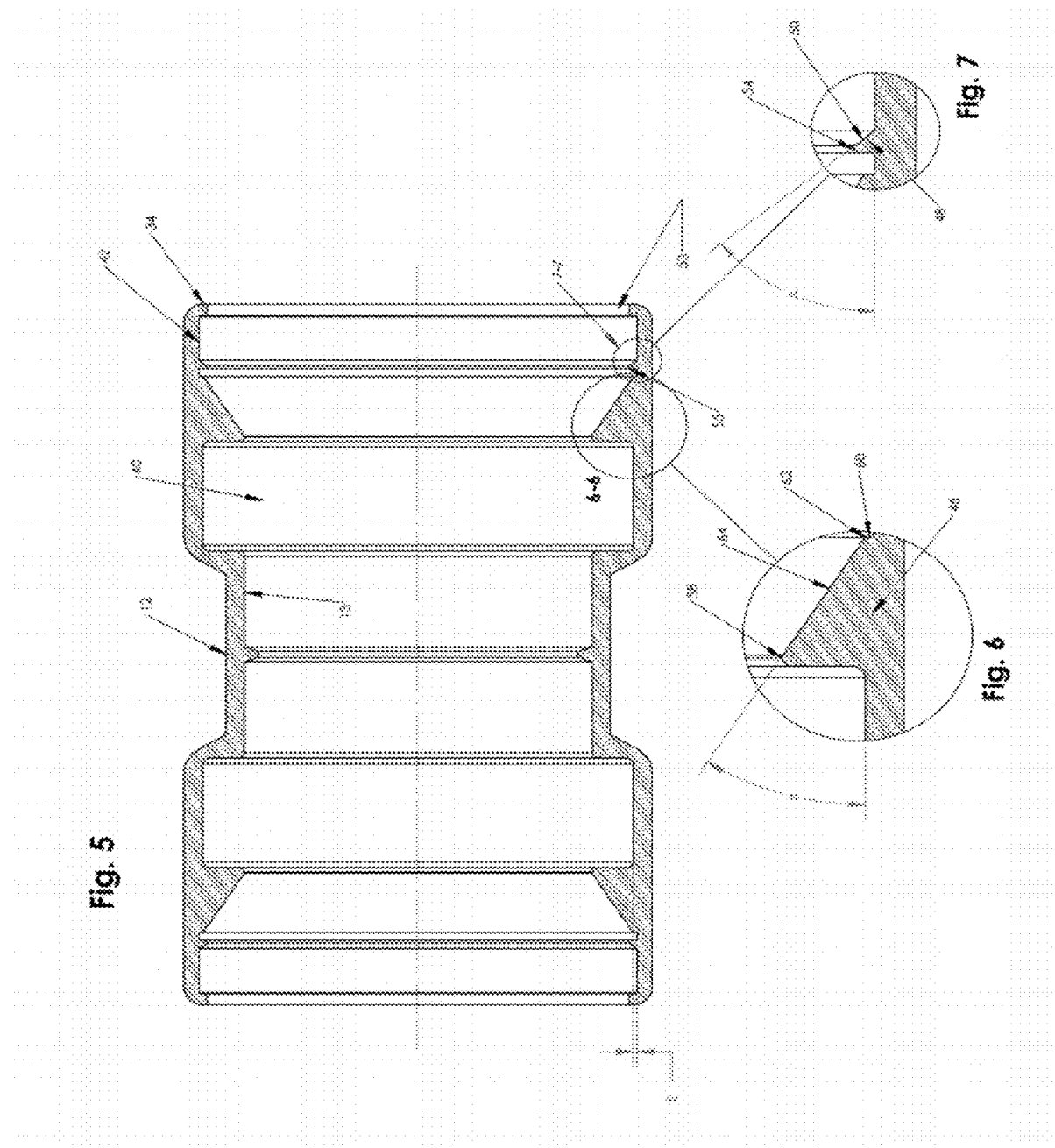

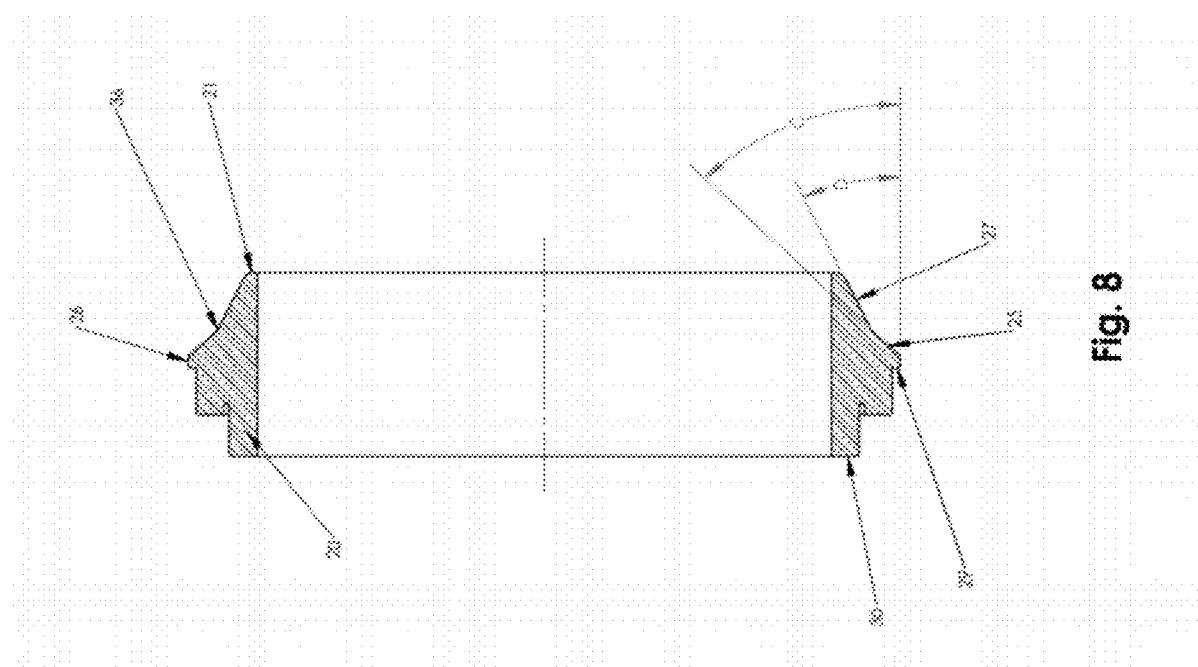

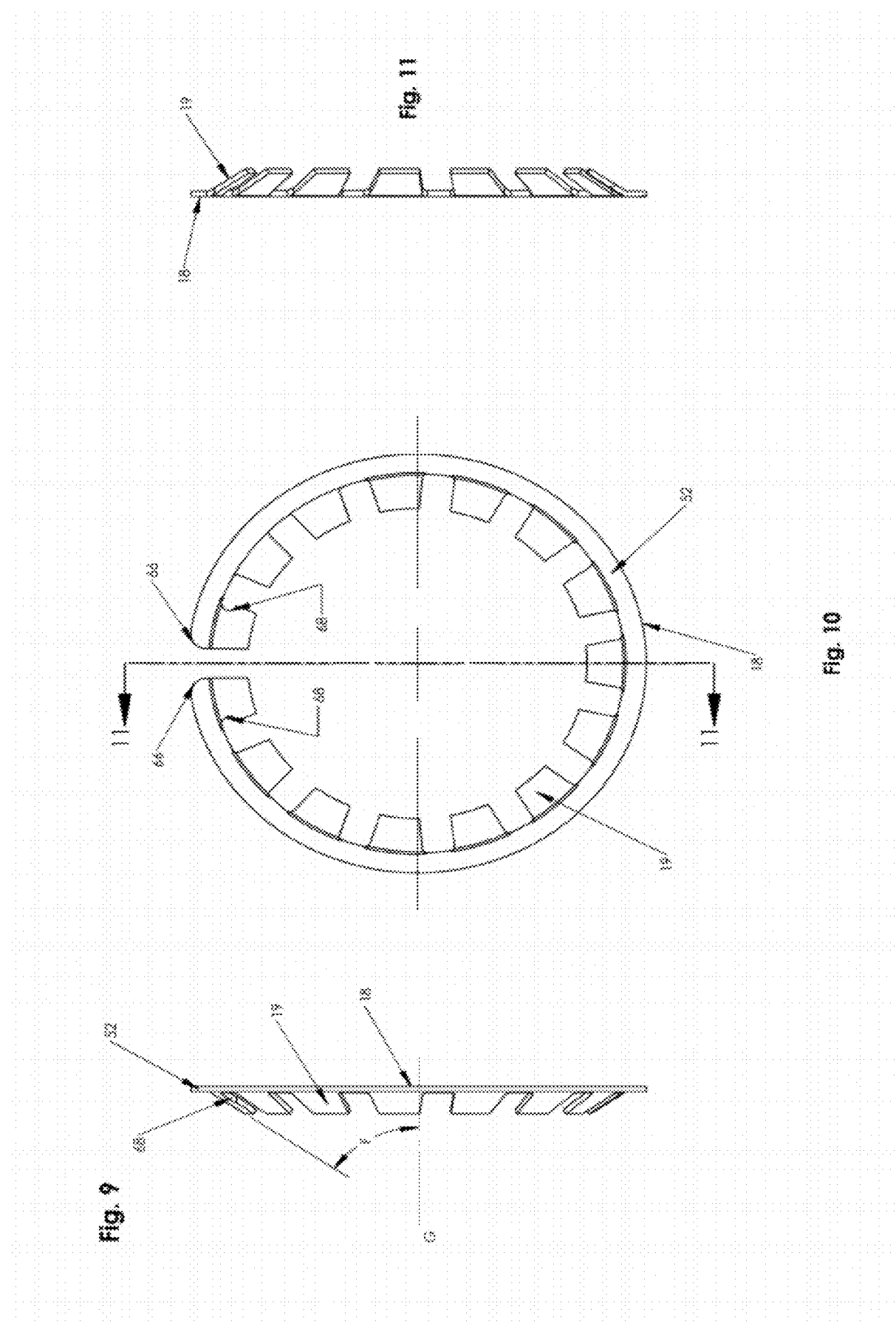

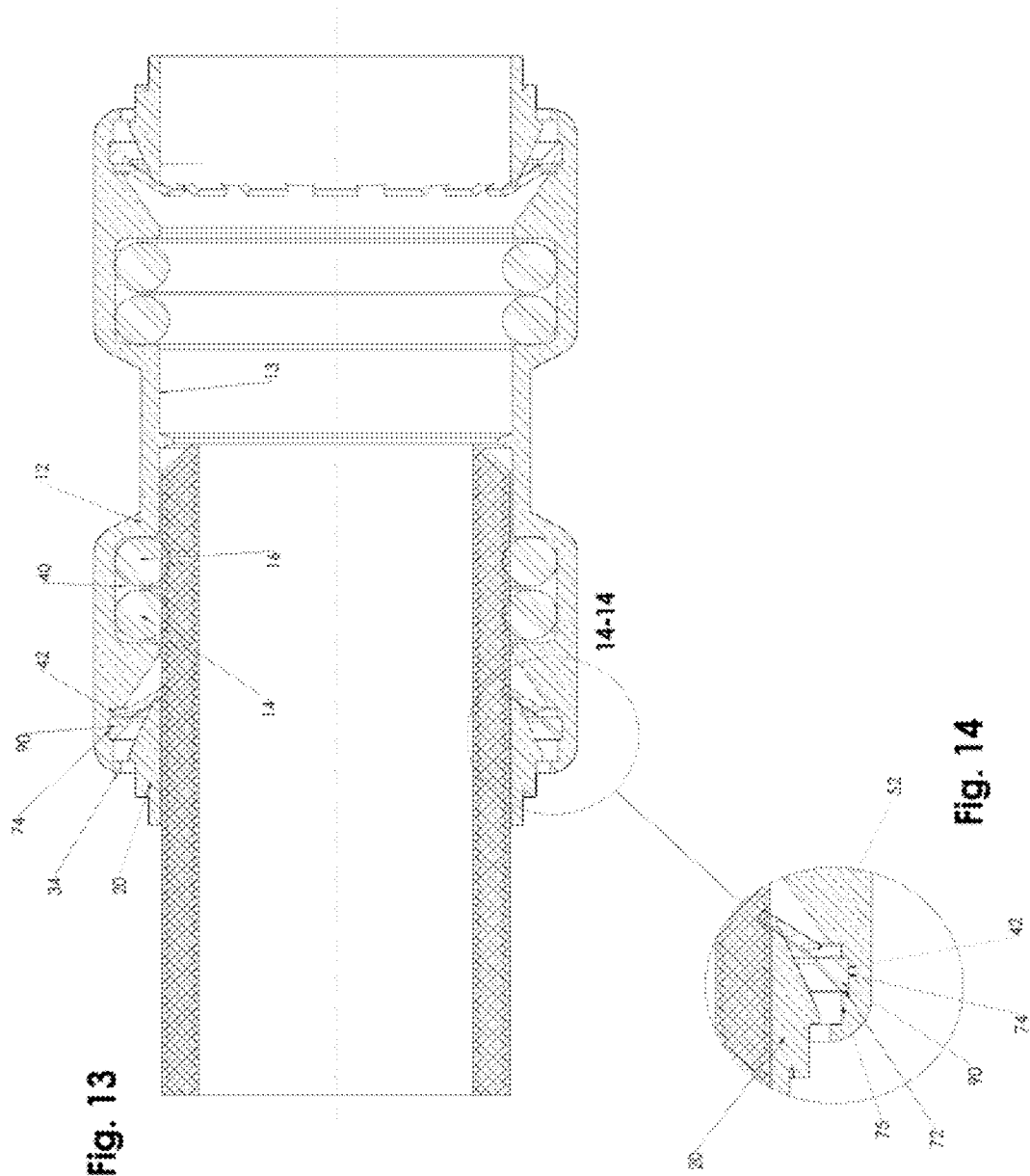

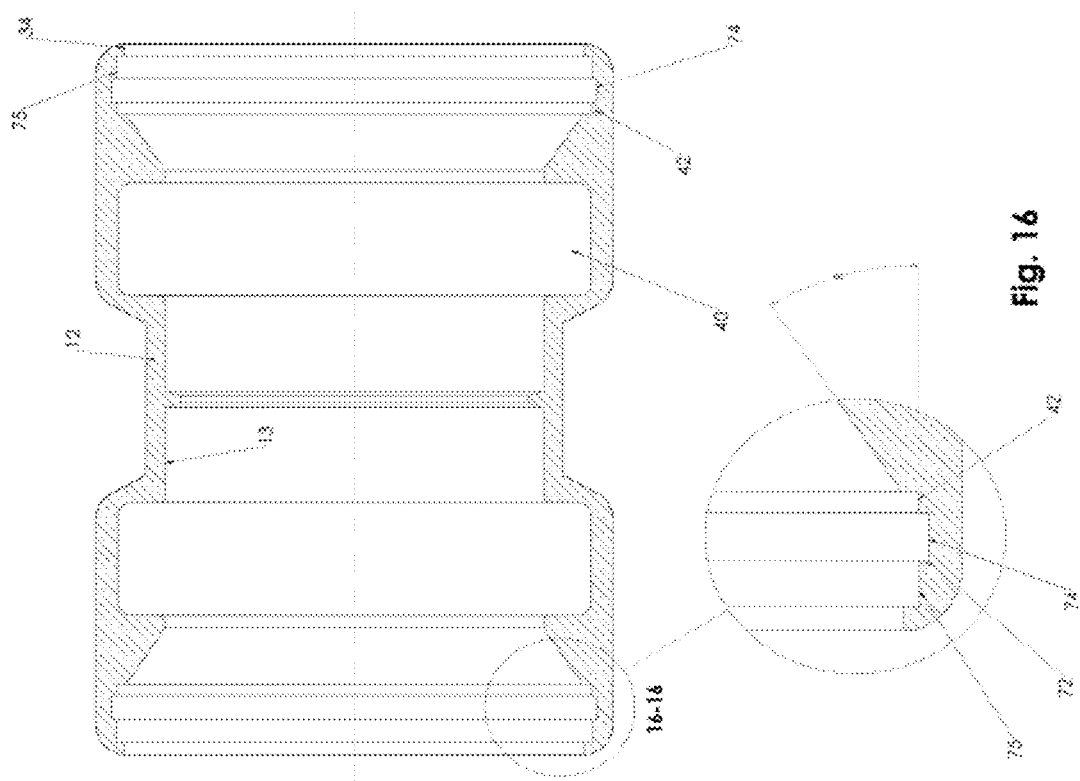

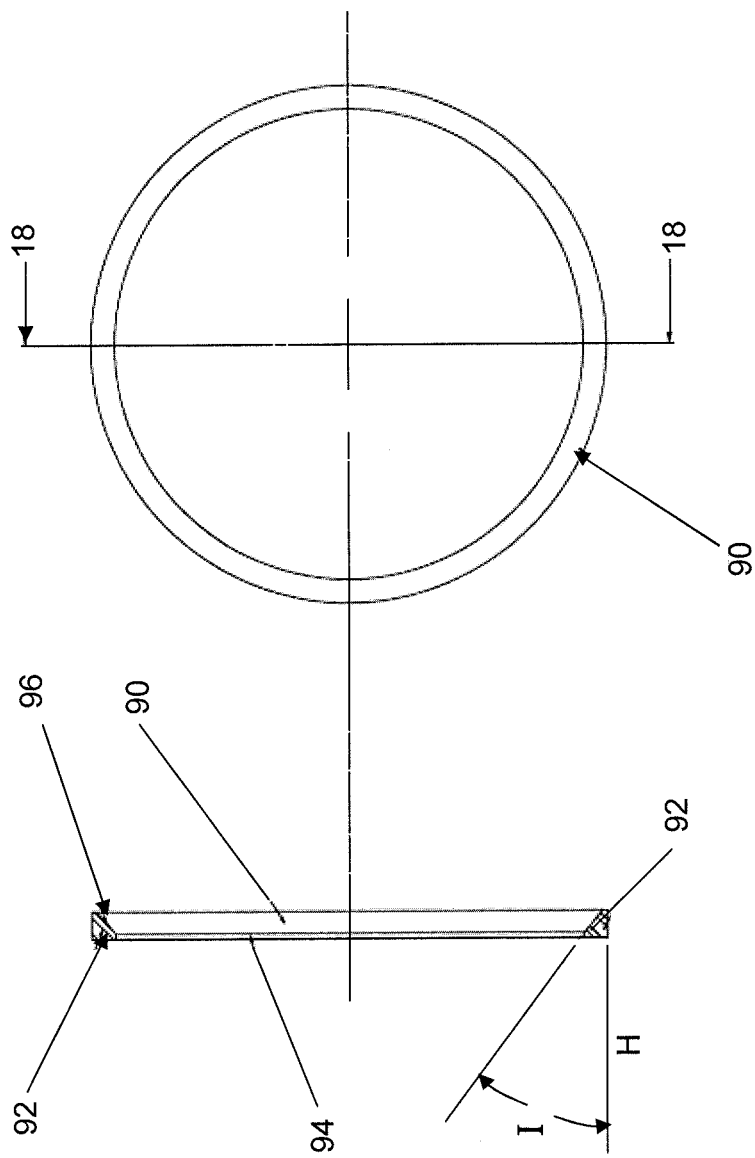

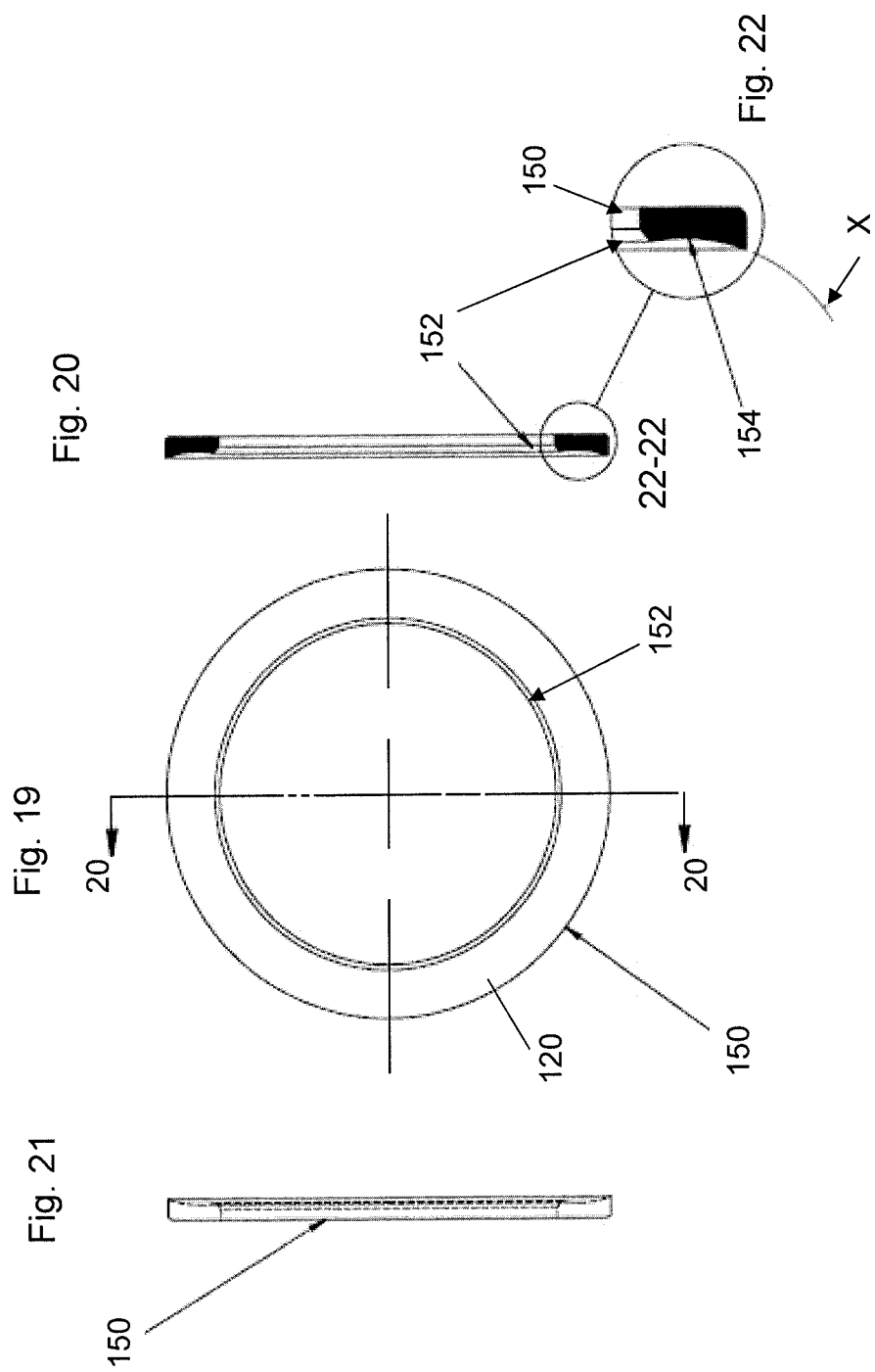

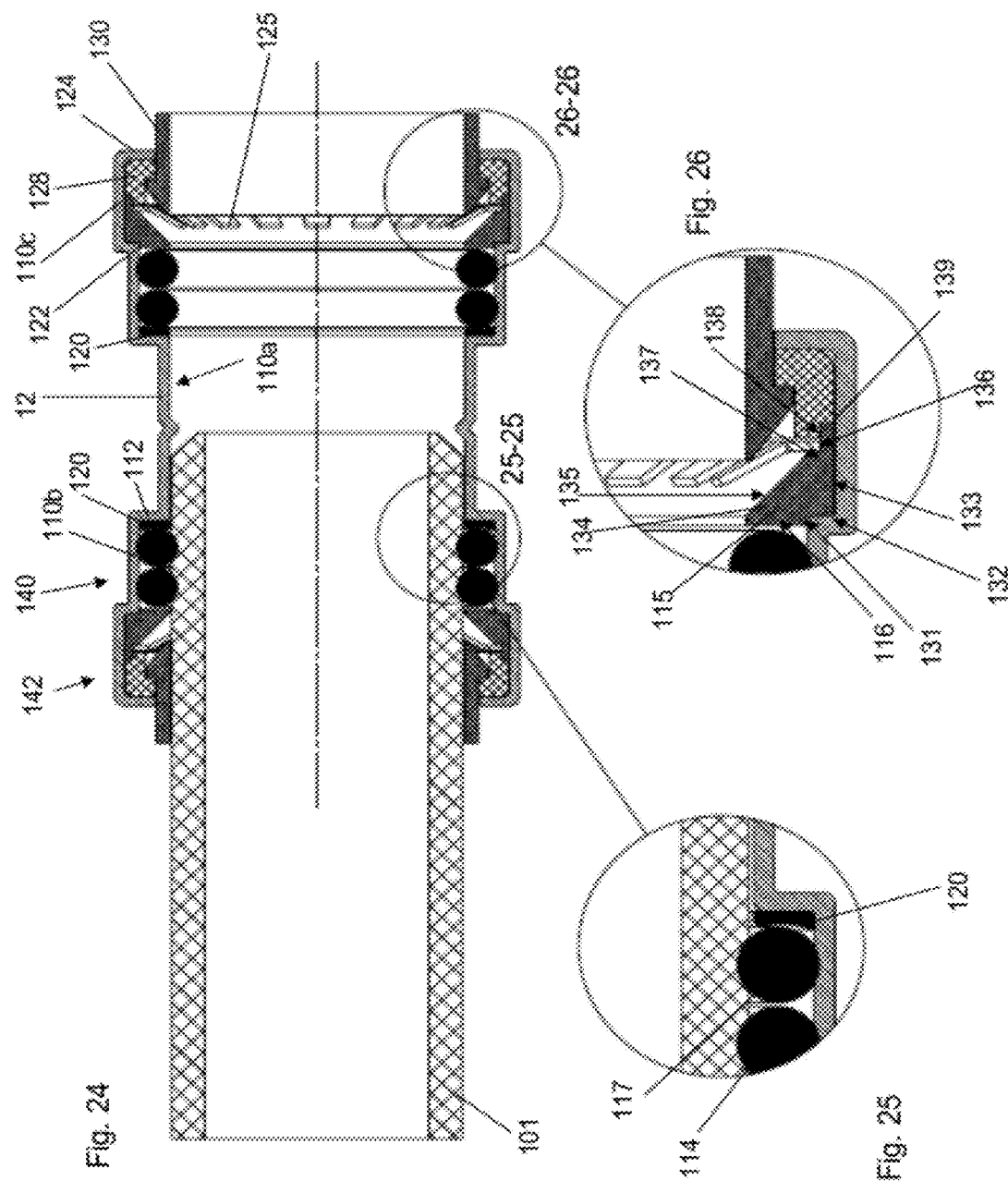

PIPING JOINT ASSEMBLY SYSTEM AND METHOD WITH SEALING RING STABILIZER

REFERENCE TO RELATED APPLICATIONS

This application is a continuation-in-part of U.S. application Ser. No. 13/246,562, filed on Sep. 27, 2011, entitled "Piping Joint Assembly, System and Method", which claims the benefit of U.S. provisional application Ser. No. 61/473,418, filed Apr. 8, 2011 and entitled "Piping Joint Assembly, System and Method", and which is also a continuation-in-part of U.S. application Ser. No. 12/981,855, entitled "Piping Joint Assembly, System and Method", filed on Dec. 30, 2010, which is a continuation of U.S. patent application Ser. No. 11/807,072, now U.S. Pat. No. 7,862,089, issued on Jan. 4, 2011. The disclosures of all of the above are incorporated herein by reference.

FIELD OF THE INVENTION

The present invention relates to fluid flow systems, and more particularly to an improved push-fit piping joint assembly, system and method that facilitates the repair and re-use of piping system parts without coining or threaded end caps.

BACKGROUND OF THE PRESENT INVENTION

Piping systems exist to facilitate the flow of fluids (e.g., liquid, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can be deployed through piping systems. Tubing/piping types can include, for example, copper, stainless steel, CPVC (chlorinated polyvinyl chloride) and PEX (cross-linked polyethylene). For purposes of the present disclosure, the term "pipe" or "piping" will be understood to encompass one or more pipes, tubes, piping elements and/or tubing elements.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

In the past, pipe elements have been traditionally connected by welding and/or soldering them together using a torch. Soldering pipe fittings can be time-consuming, unsafe, and labor intensive. Soldering also requires employing numerous materials, such as copper pipes and fittings, emery cloths or pipe-cleaning brushes, flux, silver solder, a soldering torch and striker, a tubing cutter and safety glasses. The process for soldering pipes can proceed by first preparing the pipe to be soldered, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out"—i.e., meet flush inside the fitting. The tip of the solder can be bent to the size of the pipe in order to avoid over-soldering. With the pipes and fitting in place, the torch is then ignited with the striker or by an auto-strike mechanism to initiate soldering. After heating for a few moments, if the copper surface is hot enough such that it melts when touched by the end of the solder, the solder can then be applied to the joint seam so that it runs around the joint and bonds the pipe and fitting together.

In recent years, push-fit technology has been employed with piping systems to reduce the dangers and time involved in soldering joints. Push-fit methods require minimal knowledge of pipe fitting and involve far fewer materials than soldering. For example, one may only need the pipes, quick-connect fittings, a chamfer/de-burring tool and tubing cutter in order to connect pipes using push-fit technology.

The steps involved in connecting piping systems using push-fit technology can be outlined as follows. First, the pipe is cut to the appropriate length and the end of the pipe is cleaned with the de-burring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection while creating a positive seal. Accordingly, no wrenches, clamping, gluing or soldering is involved. Push-fit and/or quick-connect technology for piping systems can be obtained, for example, through Quick Fitting, Inc. of East Providence, R.I., USA, suppliers of the CoPro® line of pipe fittings and related products. Also, such technology is described, for example, in U.S. Pat. No. 7,862,089, the disclosure of which is incorporated herein by reference in its entirety.

In past pipe coupling technology, the fastening ring is inserted into the fitting body along with a plastic grip ring support that typically fails under extensive tensile testing. Further, the coupling must then be either coin rolled, glued or receive a threaded cap member to retain the fastening ring inside the fitting body. In addition to the added steps for the manufacture and assembly of the coupling, the strength of the plumbing joint is determined by the retaining cap member. The additional steps and components add significant labor and manufacturing costs to the final product cost and reduce the overall production capability due to the extensive time required for proper assembly.

In addition to the above, when using a threaded retaining cap method, the process of cutting threads into the fitting body and the retaining cap elevates the cost of machining the fitting components. Further, the threaded end cap method requires mechanical assembly as well as the added cost and application of a thread sealant to the threads. In prior efforts that employ a coined retaining cap method, the process of coining the fitting body as the retaining cap significantly increases the cost of final assembly of the fitting. Additionally, the coining process permanently encapsulates the fastening ring inside the fitting, whereby the fastening ring cannot be removed without complete destruction of the ring and fitting.

Along with additional assembly steps and increased manufacturing costs, past pipe fittings and connection methods do not allow repair for various reasons. In some cases, this is because they are factory sealed, for example. In other cases, it is because the separation of the fitting from the pipe can damage or induce wear on the parts. For example, some push-fit pipe fittings provide permanently fixed demounting rings for removing the fittings. The demounting rings can be depressed axially to lift the fastening ring teeth off of the surface of the inserted pipe, such that the pipe can then be withdrawn. This arrangement, however, can subject the pipe fittings to tampering and shorter life. In addition, while fastening ring devices work effectively as an opposing retaining member, their functionality makes them nearly impossible to dismount, remove or detach for re-use. The fastening rings are thus permanently affixed unless they are cut and removed, which then destroys the fastening ring.

Whether connected by traditional soldering methods or with push-fit methods, past efforts have been specifically provided for the connection of like materials and lack the ability to connect two unlike materials, such as copper with CPVC, PEX or stainless steel, or any other combination of unlike materials. Past methods further invariably require the replacement of fittings and valves, and do not allow re-use of the fittings or valves in instances where only a small internal component needs to be repaired or replaced.

SUMMARY OF THE PRESENT INVENTION

The present invention provides, in part, a pipe fitting assembly package as well as a removal method allowing one to re-use push-fit piping fittings without damage to the fitting elements or the pipe. The present invention connects tubing/piping using no tools, clamps, solder or glues, while creating a leak-free seal at the connected joining area. Further, unlike prior methods, the present invention can join both like and unlike piping elements in any combination, and without coining or threading the elements into place.

The quick connection pipe joint assembly package provided as part of the present invention employs a one-piece retaining ring and pusher that, when removed, exposes the clamping, sealing and fastening mechanisms of the fitting. The retaining ring and pusher member ("release pusher" for purposes of this disclosure) moves axially and can push the fastening ring of the present invention in order to facilitate the release of a cylindrical object such as a piping element held within the fitting.

For purposes of the present disclosure, a fitting (also referred to as a body member) can encompass a valve member and other piping elements including, but not limited to: a coupling joint, an elbow joint, a tee joint, a stop end, a ball valve member, tubing and other objects having cylindrical openings. In one embodiment of the present invention, a dual seal is provided with sealing member gasket inserts (e.g., O-ring members) that fit side-by-side within a first radial housing element or chamber defined in the interior wall of the fitting. In another embodiment of the present invention, a single sealing member is employed. In addition, at each pipe receiving end of the fitting, a second radial housing element or chamber is machined into the interior wall to retain the edges of the fastening ring. The interior housing elements provide integrated support for the sealing members and fastening ring when opposing force is applied to piping elements that have been inserted into the fitting pipe. In one embodiment, a flexible metal support snap ring gland member is employed to provide additional support for the fastening ring. In another embodiment of the present invention, a housing divider element is inserted into the cavity axially outwardly of the sealing member(s) and axially inwardly of the fastening ring member. The housing divider element provides structural stability while also acting as a divider between the first and second radial housing elements. In another embodiment of the present invention, a sealing or O-ring member stabilizer element is positioned within the first housing element and axially inwardly of the sealing members. The sealing member stabilizer element is provided so as to prevent the sealing members from being "hooked" by an inserted tube or pipe and pulled further within the cavity of the fitting. The sealing member stabilizer element retains the sealing members in place within the first radial housing element. In this embodiment of the present invention, the packing arrangement can therefore comprise the sealing member stabilizer element, one or more sealing members, the housing divider element, the fastening ring, the support snap ring and the release pusher.

In one aspect of the present invention, once the fastening ring is inserted into the fitting, the fastening ring does not require any additional method or device to retain it under opposing force. The integrated radial housing element provides for a more stable fastening ring connection with the ability to withstand significantly higher tensile pulling forces than the prior art. As a result, the stability of the quick fitting fastening connection is not determined or co-dependent on a plastic retainer, threaded end cap or machined coined retainer.

The release pusher provided as part of the present invention is primarily employed to facilitate the release of tubing, piping and other cylindrical objects inserted into a fitting. The release pusher is manually pushed into the fitting body and tapered edges of the release pusher generally or nearly abut the installed fastening ring. When it is desired to release an inserted pipe, for example, from the fitting, the release pusher can be forced in the direction of the fastening ring such that its angular surfaces depress the fastening ring teeth off of the surface of the inserted pipe, thereby allowing the pipe to be removed.

BRIEF DESCRIPTION OF THE DRAWINGS

FIG. 1 is an exploded front perspective view of one embodiment of the piping joint assembly package of the present invention.

FIG. 2 is an exploded front perspective cross-sectional view of the piping joint assembly package of FIG. 1.

FIG. 3 is a front cross-sectional view of a portion of the present invention according to FIG. 1.

FIG. 4 is a detailed cross-sectional view of encircled portion 4-4 of FIG. 3.

FIG. 5 is a cross-sectional view of one embodiment of the fitting of the present invention.

FIGS. 6 and 7 are detailed cross-sectional views of encircled portions 6-6 and 7-7 of FIG. 5, respectively.

FIG. 8 is a cross-sectional view of one embodiment of the release pusher of the present invention.

FIG. 9 is a left side view of one embodiment of the fastening ring of the present invention.

FIG. 10 is a front view of the fastening ring of FIG. 9.

FIG. 11 is a right side cross-sectional view of the fastening ring taken along line 11-11 of FIG. 10.

FIG. 13 is a front cross-sectional view of a portion of the present invention according to FIG. 12.

FIG. 14 is a detailed cross-sectional view of encircled portion 14-14 of FIG. 13.

FIG. 15 is a cross-sectional view of one embodiment of the fitting of the present invention.

FIG. 16 is a detailed cross-sectional view of encircled portions 16-16 of FIG. 15.

FIG. 17 is a front view of one embodiment of the flexible support snap ring gland member of the present invention.

FIG. 18 is a right side cross-sectional view of the snap ring gland member taken along line 18-18 of FIG. 17.

FIG. 19 is a front view of a sealing ring stabilizer member in accordance with one embodiment of the present invention.

FIG. 20 is a cross-sectional view of the sealing ring stabilizer member taken along line 20-20 of FIG. 19.

FIG. 21 is a left side view of the sealing ring stabilizer member of FIG. 19.

FIG. 22 is a detailed cross-sectional view of encircled portion 22-22 of FIG. 20.

FIG. 24 is a front cross-sectional view of a portion of the present invention according to FIG. 23.

FIG. 25 is a detailed cross-sectional view of encircled portion 25-25 of FIG. 24.

FIG. 26 is a detailed cross-sectional view of encircled portion 26-26 of FIG. 24.

DETAILED DESCRIPTION OF THE PREFERRED EMBODIMENTS

Figure 12:
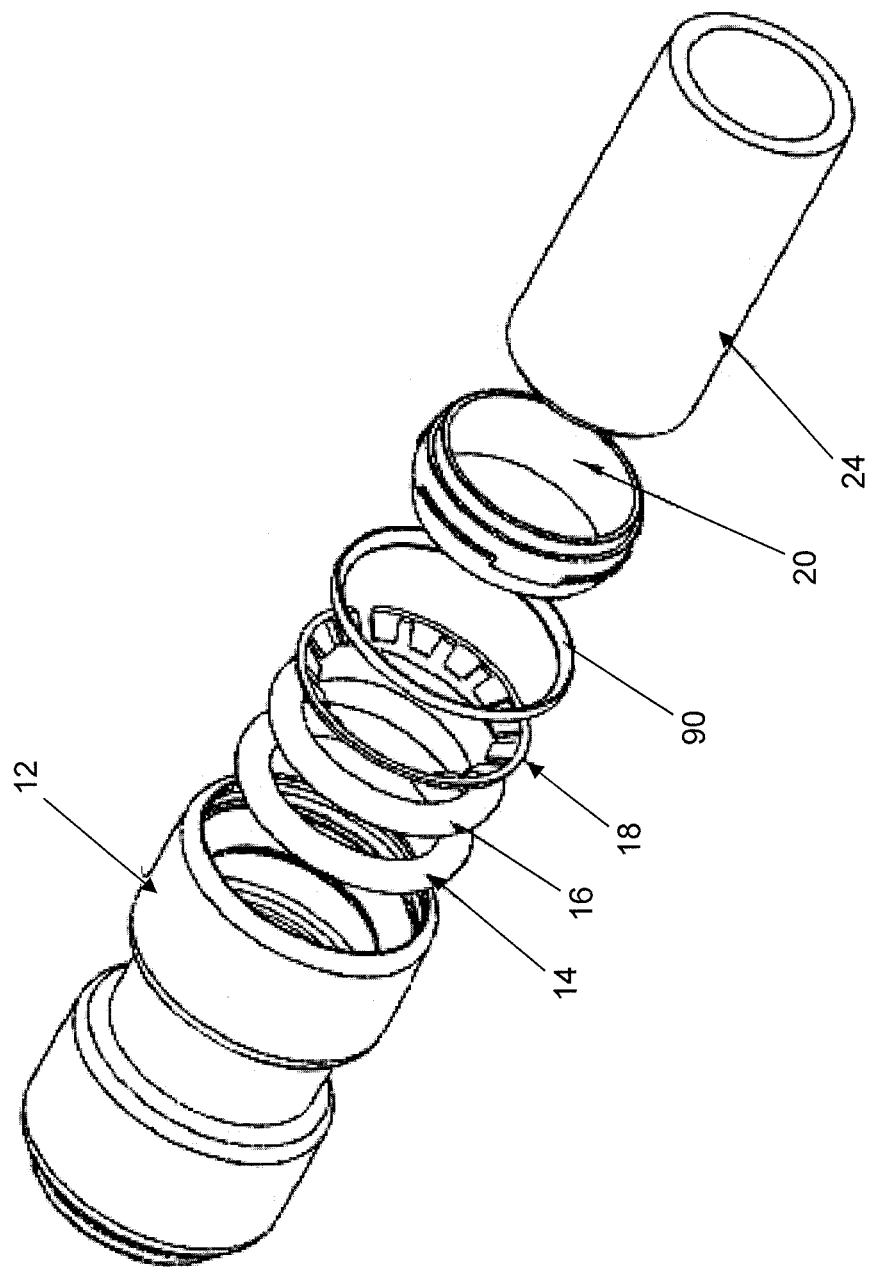
FIG. 12 is an exploded front perspective view of an alternative embodiment of the piping joint assembly package of the present invention.

In the push-fit piping joint assembly 10 as shown in FIGS. 1 and 2, elements of the joint assembly as shown include: a fitting (i.e., fitting body member) 12 having an inner wall 13 and outer wall 15, a fastening ring 18, two substantially identical sealing members 14, 16 (which can be optionally lubricated) and a release pusher 20. The fastening ring and sealing members together provide one embodiment of a packing arrangement for the present invention, and each has an internal diameter that allows for smooth and snug engagement of a piping or tubing element external surface 24. The fitting 12 is substantially hollow with a pipe receiving opening 100 therein. The fastening ring and sealing ring(s) are also hollow in the sense that their internal diameters define respective internal cavities or hollow areas through which a pipe or tube can extend. In one embodiment, the interior diameters of the fastening ring 18 (as measured to the teeth 19 and not the ring cylindrical base) and sealing members 14, 16 are substantially the same, and the interior diameters of the fitting 12 and the release pusher 20 are substantially the same. Further, the interior diameters of the fastening ring 18 and sealing members 14, 16 are slightly less than that of the fitting 12 and release pusher 20 so as to facilitate proper operation of the present invention. The release pusher 20 is substantially cylindrical and includes an external tip 21 at the fastening ring engaging end thereof.

In one embodiment, the fitting 12 can be forged CW617N brass, with full porting and full flow fitting, for example. In another embodiment of the present invention, the fitting can be formed in order to obtain the desired shape, features and elements. Such forming can be by hydroforming or hydromolding, compression forming, vacuum forming, pressure forming, tube forming and other established forming methods. Forming can be an alternative method to metal die stamping, for example. The lubricant for the sealing members 14, 16 can be a food grade lubricant, for example. It will be appreciated that the sealing members can comprise a flat ring or washer-type seal member in addition or as an alternative to a circular member of substantially circular cross-section. The fastening ring 18 can comprise a spring steel formulation, for example, that enables the fastening ring to be malformed during installation, while springing back into its originally manufactured position once installed. The fastening ring is capable of grabbing an inserted pipe's surface via two or more teeth 19 to ensure connections cannot be pulled apart. The fastening ring teeth are angled downward from the perimeter of the ring, toward the fitting and away from the cap, such that when the pipe is inserted, the teeth exert a pressure against the pipe to discourage the pipe from slipping or moving back out of the fitting. No wrenches, solder, welding, glue and/or twisting and turning the elements are required to form a connection.

As shown in FIGS. 3, 4 and 8, for example, the release pusher 20 includes a radially outer ledge 26, the external tip 21 and outer wall segments 25, 27. The release pusher can comprise an injection-molded plastic material or a metal material such as brass, for example. When pressure is applied on the back side 30 of the release pusher 20, the external tip 21 can engage the inside surface 32 of the fastening ring teeth 19 as will be described in more detail below, and the ledge back wall 29 can removeably engage a retaining lip 34 extending radially inwardly of the fitting inner wall 13 at the axially outermost position of the fitting, as shown in FIG. 3.

In one embodiment of the release pusher of the present invention, the outer wall segments 25, 27 comprise a single linear segment from the radially outer ledge to the external tip. In another embodiment of the present invention, as shown in FIG. 8, the first outer wall segment 25 extends linearly at a first angle C from the radially outer ledge 26 to an outer wall intermediate point 36, and the second outer wall segment 27 extends linearly from the outer wall intermediate point 36 to the external tip 21 at a second angle D.

During removal, a tool such as a specially adapted wrench, for example, can be applied to the outer top surface of the release pusher so as to exert a pushing and lifting force that causes the release pusher outer ledge to disengage the retaining lip 34. Once the release pusher is removed, the internal packing arrangement components are exposed for removal and/or replacement.

As shown in FIGS. 2 through 7, the fitting 12 is formed with first 40 and second 42 radial housing elements or chambers. The first radial housing element 40 houses sealing members 14, 16, and the second radial housing element 42 houses the fastening ring 18. The sealing members can be housed so as to substantially abut one another within the first radial housing element 40. Further, the sealing members 14, 16 are shown axially inward of the fastening ring 18, when in position within the fitting 12. In the embodiment shown in FIGS. 12 through 14, the second radial housing element 42 also houses a support snap ring gland member 90, described in more detail below.

The first radial housing element 40 is formed by a first housing back wall segment 44, the fitting inner wall 13 and a housing separator segment 46. The second radial housing element 42 is formed by the housing separator segment 46, the fitting inner wall 13 and a second housing front wall segment 48. The inner wall 13 is not labeled within the recesses of the housing elements 40, 42. As shown in FIG. 7, the second housing front wall segment 48 has a top angled guiding surface 50, which permits sliding engagement with the fastening ring circumferential base 52 (shown in FIG. 10) when the fastening ring 18 is either being inserted or removed. The top angled guiding surface 50 of the second housing front wall segment 48 extends from the fitting inner wall 13 at an axially outer position 53 thereof to a front wall segment tip 54 at an axially inner position 55 of the fitting inner wall 13.

As shown in FIG. 6, the housing separator segment 46 has a plateau surface 58 and a front wall 60 with a front tip 62. The housing separator segment also includes a top angled backing surface 64 that extends from the front wall tip 62 to the plateau surface 58. In one embodiment of the present invention, the distance E from the fitting inner wall 13 to the separator segment front tip 62 is approximately the same as the distance from the fitting inner wall 13 to the second housing front wall segment tip 54. In another embodiment of the present invention, as shown in FIG. 5, the distance E from the fitting inner wall 13 to the separator segment front tip 62 is less than the distance from the fitting inner wall 13 to the second housing front wall segment tip 54. This distance E can be changed as necessary to facilitate engagement and movement of the fastening ring 18 within the second radial housing element, as desired. As shown in FIG. 7, the top angled guiding surface 50 of the second housing front wall segment 48 can extend at an angle A measured from the fitting inner wall. Further, as shown in FIG. 6, the top angled backing surface 64 can extend at an angle B measured from the fitting inner wall. In one embodiment of the present invention, angles A and B are substantially the same. In one embodiment of the present invention, angle B can range from approximately 9 degrees to approximately 52 degrees, and angle A can range from approximately 6.5 degrees to approximately 50 degrees. Further, in one embodiment of the present invention, angle B is greater than angle D of the release pusher 20 (see FIG. 8) so as to facilitate proper operation of the present invention as described below.

As shown in FIGS. 1 and 9 through 11, the fastening ring 18 can be a split ring member having a circumferential base 52 and two circumferential end points 66 that do not connect. The fastening ring can further include fixture points 68 for handling and compressing the fastening ring. In one embodiment of the present invention, the fixture points 68 are provided at the split end so that a tool designed to hold the fastening ring at the fixture points can more easily handle and compress the fastening ring in order to assist with assembly or disassembly. Once compressed, the fastening ring is easily insertable into the second radial housing element 42 of the fitting 12 by releasing the hold on the fixture points 68, thereby allowing the fastening ring to expand such that the circumferential base engages the walls of the second radial housing element. The fastening ring can be removed from the second radial housing element in similar manner. No wrenches, solder, welding, glue and/or twisting and turning the elements are required to form or disengage a connection. As shown in FIG. 9, the teeth 19 of the fastening ring 18 can extend at an angle F from the horizontal axis G, wherein F ranges from approximately 39 degrees to approximately 68 degrees. In one embodiment of the present invention, angle F is approximately 56 degrees.

In operation of the present invention in accordance with the above embodiment, the fitting 12 of the present invention is provided and one or more sealing members 14, 16 are inserted into the first radial housing element 40, as shown in FIG. 3. Next, the fastening ring 18 is inserted into the second radial housing element 42, and release pusher 20 is snapped into engagement with the retaining lip 34 of the fitting 12. When a pipe 70 is inserted, it travels through the release pusher 20 into the pipe receiving cavity 100 of the fitting 12, engaging the fastening ring 18 and the one or more sealing members 14, 16. The sealing members provide a strong, leak-free seal and the fastening ring prohibits any inclination the pipe may have to slide out of position adjacent the pipe end point lip 71 (see FIG. 3) inside the pipe fitting 12.

FIGS. 12-18 illustrate an alternative embodiment of the present invention. In this embodiment, the first radial housing element 40 of the pipe fitting 12 is substantially the same as described above. Further, as shown in FIG. 12, the fitting 12, sealing members 14, 16, release pusher 20 and fastening ring 18 are similarly present. However, the second radial housing element 42 includes a front wall segment 72 that does not have a top angled guiding surface. Rather, the front wall segment 72 of the second radial housing element 42 extends radially outwardly and into the fitting inner wall 13. As such, the second radial housing element 42 includes the inner wall surface 13 for engaging the circumferential base 52 of the fastening ring 18, as well as a surface 74 for engaging the circumferential base 92 of a snap ring 90. Surface 75 provides a guiding surface for the release pusher 20 as it is pushed axially inwardly of the fitting in order to depress the fastening ring teeth so as to allow removal of an inserted pipe member, for example. As shown in FIGS. 17 and 18, the snap ring 90 includes a fastening ring-engaging surface 94 and a release pusher engaging surface 96, and is positioned in place in the fitting when the release pusher 20 is snapped or popped into engagement with the retaining lip 34 of the fitting 12. The snap ring 90 can comprise a spring steel formulation. Further, circumferential base 92 can extend from the horizontal axis H of the snap ring 90 at an angle I of between approximately 6.5 degrees and approximately 50 degrees. In a particular embodiment of the present invention, angle I is approximately 40 degrees.

While the fastening ring 18 is shown in FIG. 12 as being a split ring, the fastening ring in this embodiment of the present invention can also be an integral ring that is not split. As such, and given the lower profile of the front wall segment 72 of the second radial housing element 42, the fastening ring can be more easily inserted into the second radial housing element without as much initial deformation as that associated with the embodiment of the present invention shown in FIGS. 1-5, for example.

In the embodiment of the present invention with the snap ring 90, the snap ring can be provided with a split similar to that provided in fastening ring 18 in FIG. 1. After placing the fastening ring into the second radial housing element, the support snap ring gland 90 can be compressed with a tool using fixture points (not shown) similar to that shown for the fastening ring 18 of FIG. 10, and then positioned within the second radial housing element 42. The compression of the supporting snap ring gland is released, and the ring returns to its original manufactured size, thereby acting to retain the fastening ring in position. Next, the release pusher 20 can be pushed into place such that the ledge back wall 29 removably engages the lip member 34 of the fitting 12.

FIGS. 19-27 illustrate an alternative embodiment of the present invention. In this embodiment, as shown in FIGS. 24-26, the fitting includes an inner wall 110a that defines a piping element receiving cavity therein. The fitting includes a first radial housing element or chamber 140 formed by axially extending inner wall 110b, radially extending inner wall 112 and an outer wall 116 of housing divider element 115. The first radial housing element 140 houses the sealing members 114, 117 and a sealing ring stabilizer member 120. The second radial housing element or chamber 142 is bounded by a radially extending inner wall 122, axially extending inner wall 110c and radially extending outer wall 124. The second radial housing element 142 houses the divider element 115, fastening ring 125, support snap ring 128 and at least part of release pusher 130. As shown in FIG. 24, for example, the radially extending wall 112 provides the first radial housing element with a radial extension to the axially extending wall 110*b* beyond that provided by inner wall 110*a*. Further, the radially extending inner wall 122 provides the second radial housing element with a radial extension to the axially extending inner wall 110*c* beyond that provided by inner wall 110*b*. Accordingly, the fitting is provided with two chambers in the form of first and second radial housing elements of increasing radial extension in order to accommodate the piping packing arrangement of this embodiment of the present invention. In this way, the sealing member(s), the sealing member stabilizer element and a portion of the housing divider element 115 can snugly fit within the first radial housing element, and the remainder of the housing divider element 115, the fastening ring, the snap ring support member and the release pusher can snugly fit within the second radial housing element while providing the necessary structure to facilitate the secure retention and optional removal of an inserted piping element in accordance with many of the purposes of the present invention.

As shown in FIGS. 25-26, the housing divider element 115 is adapted to snugly fit within the axially inward portion of the second radial housing element 142. In one embodiment of the present invention, the housing divider element 115 comprises a unitary, monolithic member having an outer wall 116 with a fitting wall-engaging portion comprising an axially aligned segment 131 and a radially aligned segment 132. As shown in FIGS. 24 and 26, the axially aligned segment 131 cooperatively engages inner wall 110 of the fitting, and the radially aligned segment 132 cooperatively engages inner wall 122 so as to provide a solid and stable platform as required by the present invention. The housing divider element 115 further comprises a bottom wall 133 that cooperatively engages inner wall 110 of the fitting, and an internal wall 134 having an angled portion 135 and a platform 136 formed by radially extending ledge element 137 and axially extending ledge element 138. The divider element 115 further includes a front lip wall 139 that engages support snap ring 128 as disclosed below.

Figure 27:
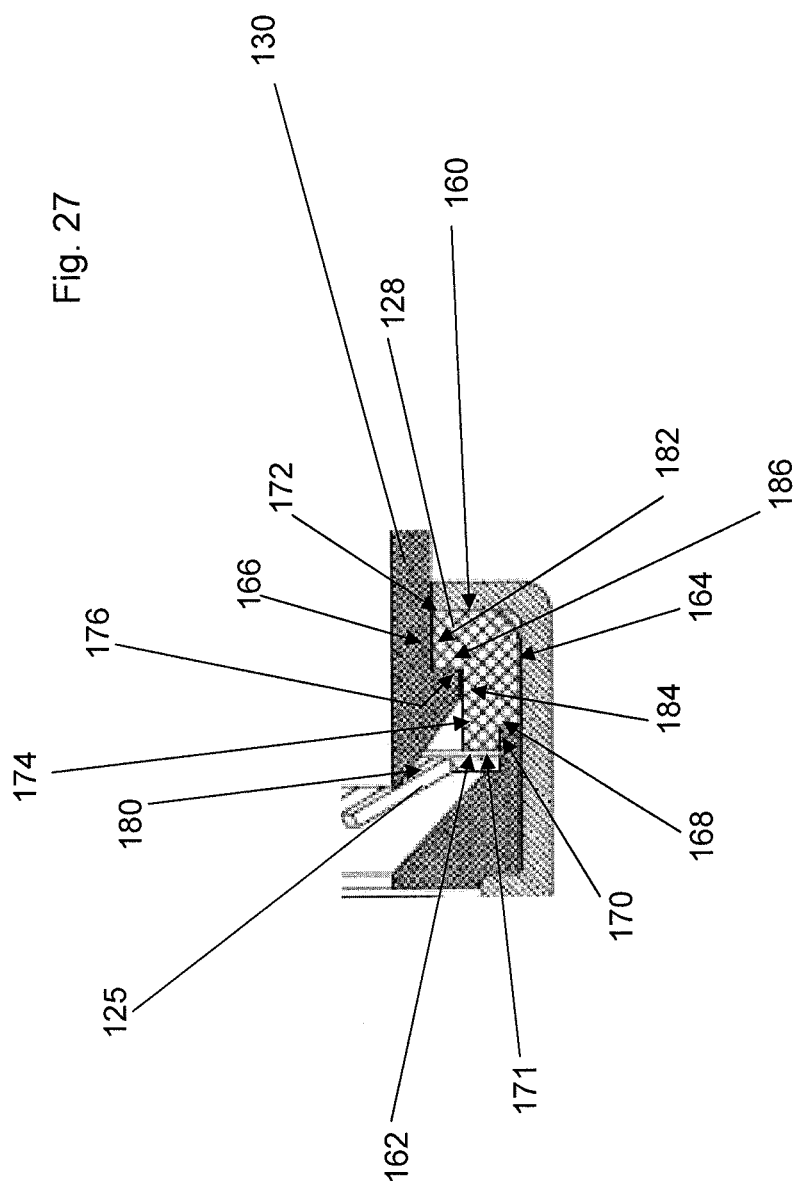
FIG. 27 is an enlarged view of a portion of FIG. 26 showing a housing divider element and a support snap ring element according to one embodiment of the present invention.
Figure 28:
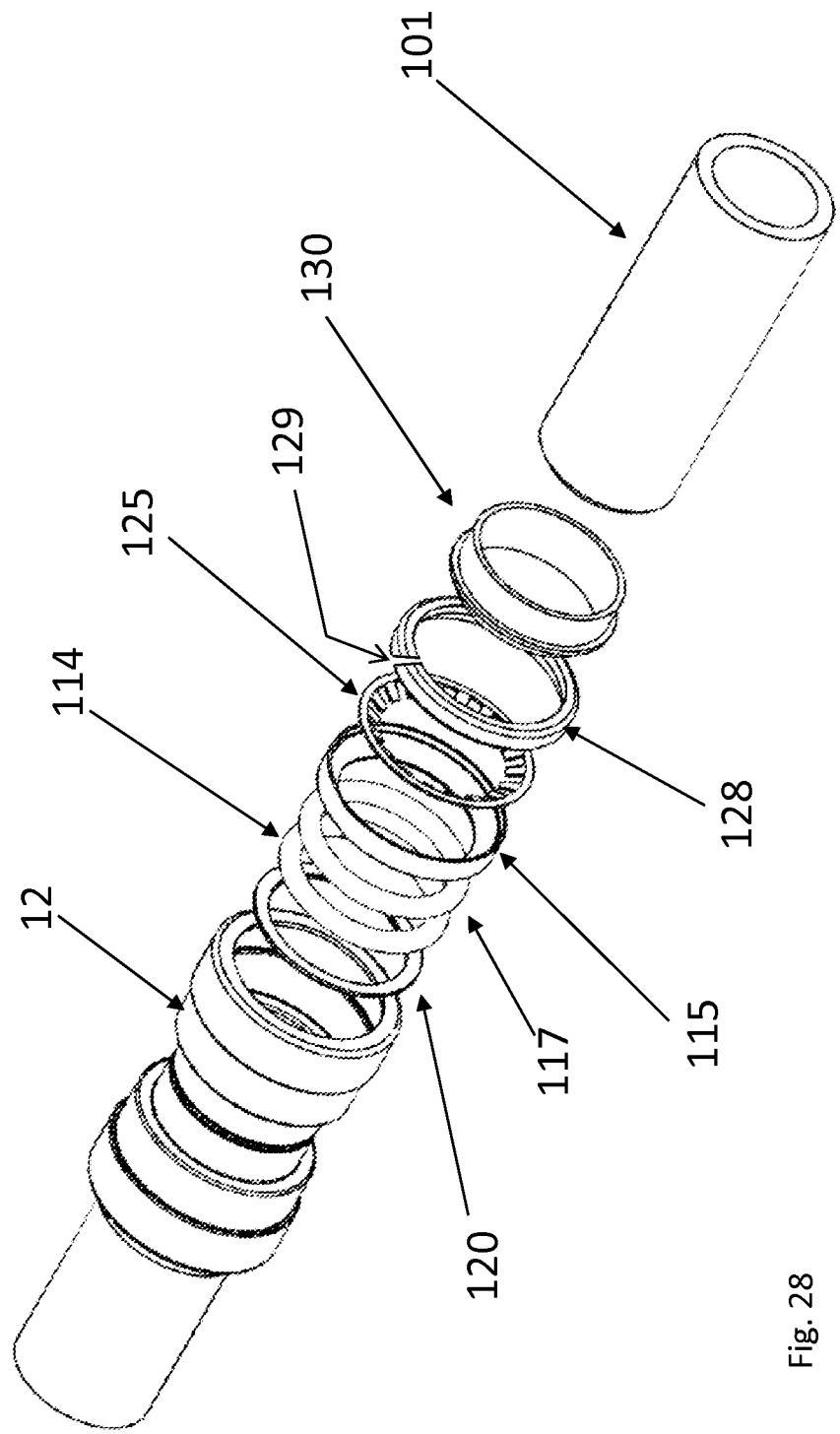

In one embodiment of the present invention as shown in FIGS. 24, 26 and 27, the support snap ring member 128 comprises a generally cylindrical and hollow monolithic member having an outer wall 160, an inner wall 162, a bottom wall 164 and a top wall 166. The inner wall 162 includes a notch comprising lead wall radial 168 and axial 170 portions for engaging the housing divider element front lip wall 139. The inner wall 162 further has an internal radial wall 171 that engages the fastening ring 125 to provide support during operation. The top wall 166 comprises a top wall primary axial portion 172, a top wall secondary axial portion 174 and a top wall radial portion 176 and cooperatively engages release pusher 130 as it is inserted into the fitting 12.

Given the construction and arrangement described above, and as shown in FIGS. 24-27, the second radial housing element 142 includes a packing arrangement comprising the housing divider element 115, fastening ring 125, support snap ring 128 and release pusher 130. The fastening ring 125 rests on the platform 136 of the divider element 115, thereby not extending all of the way to the interior wall 110 of the fitting 12. The support snap ring 128 engages the fastening ring 125 so as to snugly hold the fastening ring against the housing divider element 115, and the angled portion 135 of the internal wall 134 of the divider element permits the fastening ring 125 to bend axially inwardly when pushed by the release pusher 130, which permits the ring to be lifted off of an inserted piping element to thereby allow the piping element to be removed from the fitting. The release pusher 130 is provided with angled outer edge 180, body portion 182 and catch wall members 184, 186 in order to provide adequate surface area for engaging the support snap ring 128 when inserted into the fitting. As such, the release pusher 130 can rest snugly in position within the fitting. When a piping element is inserted into the fitting, as shown on the left in FIG. 24, for example, the release pusher 130 is maintained in position by the piping element 101, fitting 12, snap ring 128 and fastening ring 125. The snap ring 128 maintains contact with the fitting 12, release pusher 130, fastening ring 125 and housing divider element 115. The fastening ring 125 maintains contact with the piping element 101, the release pusher 130, housing divider element 115 and snap ring 128. The divider element 115 maintains contact with the fitting 12, the piping element 101, the fastening ring 125 and the snap ring 128. The divider element 115 further maintains contact with the sealing member 114 as described below.

As shown in FIGS. 19-22, the sealing ring stabilizer member 120 comprises a hollow ring-shaped member having a base portion 150, an angled ledge portion 152 and a curved sealing member engaging surface 154. In one embodiment of the present invention, the curved sealing member engaging surface 154 is formed with a radius X that can range from approximately 0.055 inches to approximately 0.415 inches, inclusive. The surface 154 faces the adjacent sealing member (e.g., 114 or 117) when installed.

Figure 23:
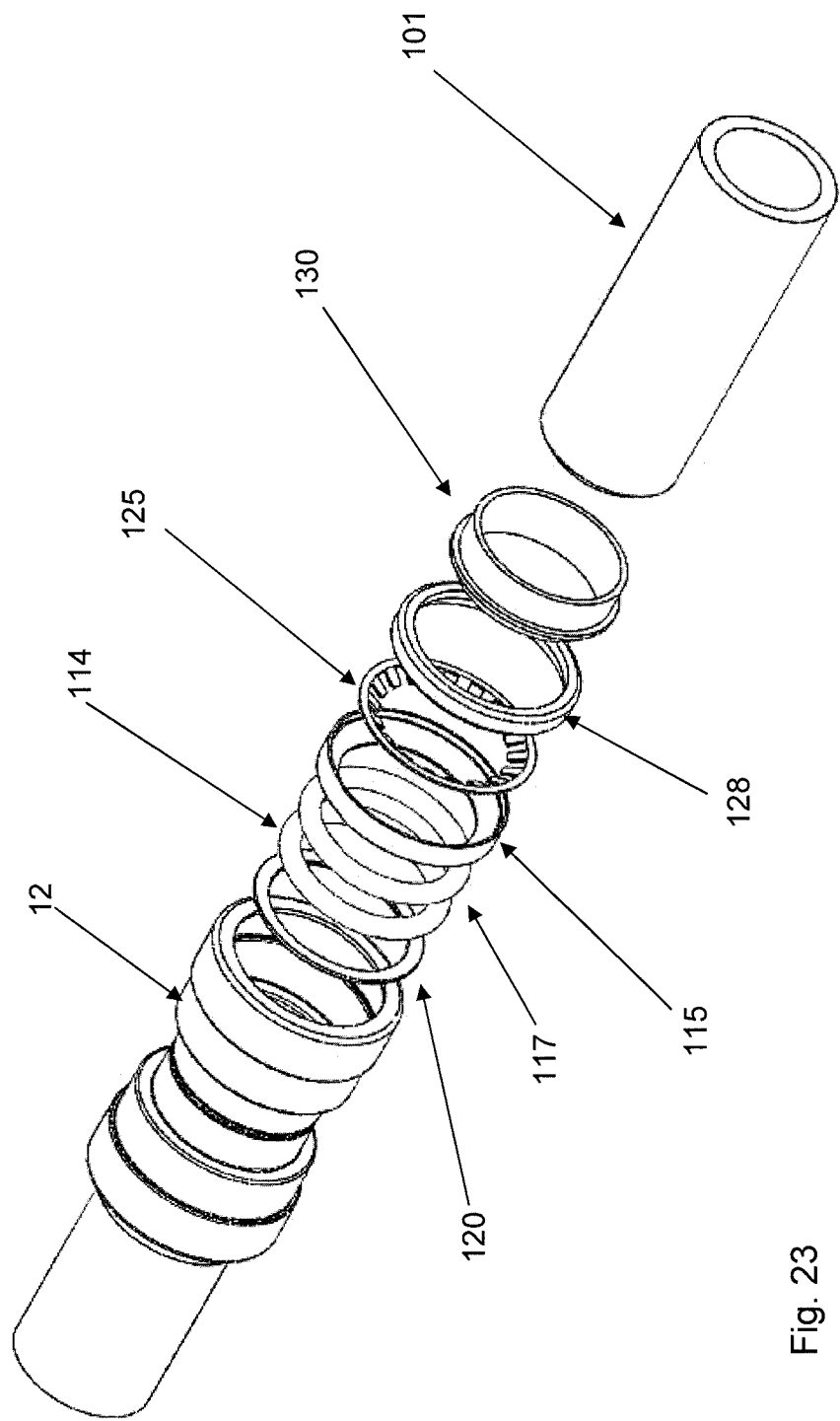
FIGS. 23 and 28 are exploded front perspective views of alternative embodiments of the piping joint assembly package of the present invention.

As shown in FIG. 24, the sealing ring stabilizer member 120 is positionable within the internal cavity of the piping member 101 so as to be axially inward of the sealing ring(s) therein. The sealing member stabilizer element is provided so as to prevent the sealing members from being "hooked" by an inserted tube or pipe and pulled further within the cavity of the fitting. The sealing member stabilizer element retains the sealing members in place within the first radial housing element. As shown in FIGS. 23-24, for example, the packing arrangement according to this embodiment of the present invention comprises the sealing member stabilizer element 120, at least one sealing member 114, 117, the housing divider element 115, the fastening ring 125, the support snap ring 128 and the release pusher 130.

In operation of the present invention in accordance with FIGS. 19-28, the fitting 12 of the present invention is provided and as a formed fitting as described with respect to previous embodiments above. For instance, the fitting can be by hydroforming or hydromolding, compression forming, vacuum forming, pressure forming, tube forming and/or other established forming methods. The sealing member stabilizer element 120 along with one or more sealing members 114, 117 are inserted into the first radial housing element 140, as shown in FIG. 24. Next, the divider element 115 and the fastening ring 125 are inserted into the second radial housing element 142, followed by snap ring member 128 and release pusher 130, which is snapped into engagement with the snap ring member as shown in FIGS. 24, 26 and 27. It will be appreciated that fastening ring member 125 and snap ring member 128 can be provided with a split (see, e.g., element 129 in FIG. 28) as described in connection with other embodiments above, or can be integrated members without any split thereon. Providing a split fastening ring and snap ring member can facilitate installation and removal as described above. The divider element 115 abuts the sealing member 117 to snugly retain it in place within the first radial housing element. When a pipe or tubing 101 is inserted, it travels through the release pusher 130 into the pipe receiving cavity of the fitting 12, engaging the fastening ring 125 and the one or more sealing members 114, 117. The sealing members provide a strong, leak-free seal and are hindered from being hooked and pulled further into the fitting by stabilizer member 120. Further, the fastening ring 125 prohibits any inclination the pipe or tubing may have to slide out of position inside the pipe fitting 12. If it is desired to remove the pipe of tubing, the release pusher can be pushed further into the fitting (for example, using an external tool as described above), which causes the fastening ring 125 to release its hold on the pipe or tubing, thereby allowing the pipe or tubing to be pulled out of the fitting without damaging any internal parts.

The angles and dimensions described herein will be understood to be exemplary and provided as embodiments associated with proper working operation of the present invention. For example, the angles of the top surfaces of members 46 and 48 contribute to the stability of the present invention as well as the easy manipulation of its component parts.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A pipe fitting assembly, comprising:
   a housing divider element;
   a fitting having an inner wall defining a cavity for receiving a piping element, the fitting inner wall and the housing divider element defining first and second radial housing elements;
   at least one sealing ring maintained within the first radial housing element and cooperatively engaging the housing divider element;
   a sealing ring stabilizer element maintained within the first radial housing element axially inwardly of, and cooperatively engaging, the at least one sealing ring, wherein the sealing ring stabilizer element includes a curved sealing ring engaging surface; and
   a fastening ring having a plurality of teeth angled inwardly from and along the circumference of the ring, the fastening ring maintained within the second radial housing element.

2. The assembly of claim 1, wherein the at least one sealing ring comprises at least two sealing rings in contact with each other.

3. The assembly of claim 1 further comprising a snap ring support member maintained within the second radial housing element.

4. The assembly of claim 3 wherein the snap ring support member includes an inner wall having an internal radial wall, and lead wall radial and axial portions, wherein the housing divider element includes a front lip wall, wherein the snap ring support member lead wall radial and axial portions cooperatively engages the housing divider element front lip wall, and wherein the snap ring support member internal radial wall abuts the fastening ring.

5. The assembly of claim 3 wherein the snap ring support member is split.

6. The assembly of claim 1 wherein the fastening ring is maintained within the second radial housing element by the housing divider element and without contacting the fitting inner wall.

7. The assembly of claim 1 wherein the housing divider element includes a platform and wherein the fastening ring is maintained within the second radial housing element via contact with the housing divider element platform.

8. The assembly of claim 1 further comprising a release pusher removably engaged within an axially outer portion of the fitting inner wall.

9. The assembly of claim 1 wherein the fastening ring is split.

10. The assembly of claim 1 wherein the fitting is formed and not dye-stamped.

11. A pipe fitting assembly, comprising:
    a fitting having an inner wall defining a cavity for receiving a piping element; and
    a packing arrangement maintained within the fitting, comprising:
       a sealing ring stabilizer element, having an inwardly curved sealing ring engaging surface;
       at least one sealing ring positioned adjacent the stabilizer element;
       a housing divider element positioned adjacent the at least one sealing ring;
       a snap ring support member positioned adjacent the housing divider element;
       a fastening ring in cooperative engagement with the housing divider element and the snap ring support member; and
       a release pusher in cooperative engagement with the fastening ring, snap ring support member and fitting.

12. A method for assembling a pipe joint assembly, comprising the steps of:
    providing a housing divider element;
    providing a fitting having an inner wall defining a cavity for receiving a piping element, the fitting inner wall and the housing divider element defining first and second radial housing elements;
    inserting a sealing ring stabilizer element into the first radial housing element, wherein the sealing ring stabilizer element includes a curved sealing ring engaging surface;
    inserting at least one sealing ring into the first radial housing element such that the at least one sealing ring cooperatively engages the housing divider element and the sealing ring stabilizer element; and
    inserting a fastening ring into the second radial housing element.

13. The method of claim 12, wherein the at least one sealing ring comprises at least two sealing rings in contact with each other.

14. The method of claim 12 including the step of inserting a snap ring support member into the second radial housing element.

15. The method of claim 14 wherein the snap ring support member includes an inner wall having an internal radial wall, and lead wall radial and axial portions, wherein the housing divider element includes a front lip wall, wherein the snap ring support member lead wall radial and axial portions cooperatively engages the housing divider element front lip wall, and wherein the snap ring support member is inserted such that the snap ring support member internal radial wall abuts the fastening ring.

16. The method of claim 14 wherein the snap ring support member is split.

17. The method of claim 12 wherein the fastening ring is maintained within the second radial housing element by the housing divider element and without contacting the fitting inner wall.

18. The method of claim 12 wherein the housing divider element includes a platform and wherein the fastening ring is maintained within the second radial housing element via contact with the housing divider element platform.

19. The method of claim 12 including the step of inserting a removable release pusher within an axially outer portion of the fitting inner wall.

20. The method of claim 12 wherein the fastening ring is split.

21. The method of claim 12 wherein the fitting is a formed fitting and is not dye-stamped.

* * * * *